US008155717B1

(12) United States Patent  (10) Patent No.: US 8,155,717 B1
Watson  (45) Date of Patent: Apr. 10, 2012

(54) CELLULAR PHONE CASING AND ASSOCIATED METHOD

(76) Inventor: Marcus Watson, Chicago, IL (US)

( * ) Notice: Subject to any disclaimer, the term of this patent is extended or adjusted under 35 U.S.C. 154(b) by 264 days.

(21) Appl. No.: 12/698,655

(22) Filed: Feb. 2, 2010

(51) Int. Cl.
H04M 1/03 (2006.01)
H04B 1/38 (2006.01)
H05K 5/00 (2006.01)

(52) U.S. Cl. ............... 455/575.3; 455/90.3; 361/679.56; 379/433.13

(58) Field of Classification Search .... 455/575.1–575.8, 455/90.1–90.3; 379/433.01–440; 361/679.55–679.56
See application file for complete search history.

(56) References Cited

U.S. PATENT DOCUMENTS

| | | | |
|---|---|---|---|
| 5,896,453 A * | 4/1999 | Speaks | 379/433.01 |
| 6,731,913 B2 * | 5/2004 | Humphreys et al. | 455/90.3 |
| 6,942,153 B1 * | 9/2005 | Yuan et al. | 235/472.01 |
| 7,251,512 B2 * | 7/2007 | Komiyama | 455/575.3 |
| 7,400,917 B2 * | 7/2008 | Wood et al. | 455/575.8 |
| 7,561,684 B2 * | 7/2009 | Tsutaichi et al. | 379/433.01 |
| 7,755,975 B2 * | 7/2010 | Pettersen et al. | 367/131 |
| 7,907,394 B2 * | 3/2011 | Richardson et al. | 361/679.3 |
| 7,941,196 B2 * | 5/2011 | Kawasaki et al. | 455/575.8 |
| 8,032,194 B2 * | 10/2011 | Liu et al. | 455/575.8 |
| 2005/0181745 A1 * | 8/2005 | Wood et al. | 455/90.3 |
| 2006/0003709 A1 * | 1/2006 | Wood | 455/90.3 |
| 2007/0254697 A1 * | 11/2007 | Sugio et al. | 455/556.2 |
| 2008/0132289 A1 * | 6/2008 | Wood et al. | 455/566 |
| 2009/0117957 A1 * | 5/2009 | Araki et al. | 455/575.8 |
| 2009/0167545 A1 * | 7/2009 | Osaka | 340/647 |
| 2009/0191927 A1 * | 7/2009 | Hong | 455/575.8 |
| 2009/0279269 A1 * | 11/2009 | Shiue | 361/757 |

* cited by examiner

Primary Examiner — Matthew Sams (57) ABSTRACT

A combined cellular phone and water-proof casing may include a cellular telephone. The cellular phone may include a display screen and a key pad communicatively coupled thereto. A protective water-proof casing may be connected to the cellular telephone in such a manner that the display screen remains operably responsive to the key pad after the cellular telephone is submerged in water. The water-proof casing may further include a first sheath and a second sheath. The second sheath may further be mated to the first sheath. A gasket may be intermediately intercalated between the first and second sheaths and thereby prevent water from penetrating through the outer edges of the first and second sheaths respectively. A plurality of ports may be formed in the water-proof casing, and a plurality of port covers may be removably interfitted within the ports.

10 Claims, 6 Drawing Sheets

CELLULAR PHONE CASING AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cellular phones and, more particularly, to a cellular phone casing for providing users with an easy and convenient means of water-proofing and keeping their cellular phones safe and dry.

2. Prior Art

The International Telecommunication Union estimates that mobile cellular subscriptions worldwide would reach approximately 4.6 billion by the end of 2009. Mobile phones have gained increased importance in the sector of Information and communication technologies for development in the 2000s and have effectively started to reach the bottom of the economic pyramid. Literally speaking, everyone from teenagers to retirees has a cell phone today. Typically, cell phones are used for a variety of purposes, including keeping in touch with family members, conducting business, and having access to a telephone in the event of an emergency. Some individuals keep multiple cell phones in some cases for legitimate reasons such as having one phone for business and another for personal use, though a second cell phone may also be used to covertly conduct an affair or illicit business transaction.

Cell phones are practically maintenance free whereby the only "maintenance" required is a change of battery. These cell phones are usually carried in the pocket of a male user or in the handbags of a female user respectively. Many cell phones are lost when they fall out of these unsecured enclosures. They may be recovered by the owners if they happened to land on a floor or a visible location. But in instances where they are to drop onto a wet surface or into water, they may be damaged for ever. In this respect, more cellular phones are damaged by water than any other way. In spite of this, most cell phone casings are not water or at least somewhat water proof like most all watches are.

Accordingly, a need remains for an apparatus in order to overcome the above-noted shortcomings. The present invention satisfies such a need by providing a cellular phone casing that is convenient and easy to use, is durable yet lightweight in design, is versatile in its applications, and provides an easy and convenient means of water-proofing and keeping cellular phones safe and dry.

BRIEF SUMMARY OF THE INVENTION

In view of the foregoing background, it is therefore an object of the present invention to provide an apparatus for maintaining said cellular phone at an operable mode after being submerged in water. These and other objects, features, and advantages of the invention are provided by a cellular phone casing.

The combined cellular phone and water-proof casing may include a cellular telephone. The cellular phone may include a display screen and a key pad communicatively coupled thereto. The display screen may be physically spaced from the key pad. A protective water-proof casing may be connected to the cellular telephone whereby the display screen remains operably responsive to the key pad after the cellular telephone is submerged in water.

The water-proof casing may further include a first sheath and a second sheath preferably having corresponding outer edges. The second sheath may further be mated to the first sheath such that the outer edge of the second sheath entirely and coextensively adjoins the outer edge of the first sheath. A gasket may be intermediately intercalated between the first and second sheaths and thereby prevent water from penetrating through the outer edges of the first and second sheaths respectively. A plurality of ports may be formed in the water-proof casing, and a plurality of port covers may be removably interfitted within the ports. Such an arrangement may provide the unexpected and unpredicted advantage of combining a cellular telephone with a water-proof casing whereby the apparatus may be submerged in water without the fear of water getting into and damaging the cellular phone.

In one embodiment, the combined cellular phone and water-proof casing may further include a moisture sensor connected to an outer surface of the first sheath. A power source may be seated within the second sheath and electrically coupled to the moisture sensor. A transducer may be communicatively coupled to the moisture sensor and located at the outer surface of the first sheath. Further, upon detecting water, the moisture sensor may generate and transmit a control signal to the transducer such that upon receiving the control signal, the transducer may generate and emit an alert signal for a predetermined time interval. Such an arrangement may provide the unexpected and unpredicted advantage of enabling a user to locate his/her cellular phone if it is accidentally dropped in water which may be murky or dark.

The first sheath may include a first segment preferably having a recessed portion formed at a bottom surface thereof and a plurality of cut-out segments aligned about the ports and the keypad of the cellular phone respectively. A second segment may further house the display screen of the cellular phone. A top edge of the first segment may be pivotally coupled to bottom edge of the display screen such that the first sheath is pivotal along a pivot axis traversing overlapping regions of the first and second segments respectively. Such an arrangement may provide the unexpected and unpredicted advantage of integrating the cellular phone with the water-proof casing in a manner whereby the display screen, keypads and communication ports of the cellular phone may be effectively utilized in the water-proof casing.

The display screen may include front and rear viewing panels respectively positioned at front and rear sides of the second segment of the first sheath. The second sheath may include a first segment preferably having a recessed portion formed at a top surface such that the keypad of the cellular phone may be nested within the recessed portion of its first segment. The first segment may further include a plurality of cut-out portions aligned about the ports.

A second segment may include a plurality of openings formed therein and thereby provide open lines of sight to the second viewing panel. Further, the first segment may be pivotally mated to the second segment of the second sheath and thereby pivotal along the pivot axis. Such an arrangement may provide the unexpected and unpredicted advantage of integrating the cellular phone with the water-proof casing in a manner whereby the electronic components and communication ports of the cellular phone may be effectively enclosed within the water-proof casing while at the same time allowing the cellular phone to be hingedly opened and closed easily about the pivot axis.

The gasket may include a first continuous member intercalated along corresponding outer perimeters of the first segments of each of the first and second sheaths respectively. A second continuous member may further be intercalated along corresponding outer perimeters of the second segments of each of the first and second sheaths respectively. The first and second continuous members may further be directly connected along the pivot axis. Such an arrangement may provide the unexpected and unpredicted advantage of effectively sealing the outer edges the first and second sheaths respectively to prevent entry of water when the sheaths are closed together.

In one embodiment, the combined cellular phone and water-proof casing may include a first plurality of conductive terminals communicatively coupled to the keypad and located at a bottom edge of the second section of the second sheath. A second plurality of conductive terminals may be communicatively coupled to the display screen and located at the bottom edge of the second section of the first sheath. In this way, the first and second pluralities of conductive terminals may be electrically mated together and thereby communicatively couple the keypad to the display screen.

The invention may further include a method of utilizing a combined cellular phone and water-proof casing for maintaining the cellular phone at an operable mode after being submerged in water. Such a method may include the chronological steps of: providing a cellular telephone including a display screen and a key pad communicatively coupled thereto; providing a protective water-proof casing; and connecting the water-proof casing to the cellular telephone in such a manner that the display screen remains operably responsive to the key pad after the cellular telephone is submerged in water.

The method may further include the sub-steps of: providing a first sheath preferably having an outer edge; providing a second sheath preferably having an outer edge; providing and mating the second sheath to the first sheath such that the outer edge of the second sheath entirely and coextensively adjoins the outer edge of the first sheath; providing and preventing water from penetrating through the outer edges of the first and second sheaths respectively by providing and intermediately intercalating a gasket between the first and second sheaths; providing a plurality of ports formed in the water-proof casing; providing and removably interfitting a plurality of port covers within the ports; and providing the display screen to preferably be physically spaced from the key pad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-8 by the reference numeral 10 and is intended to provide a combined cellular phone and water-proof casing. It should be understood that the combined cellular phone and water-proof casing 10 may be used to water-proof and keep users' cellular phones safe and dry from wet environments such as bodies of water and rain fall.

Referring generally to FIGS. 1-8, the combined cellular phone and water-proof casing 10 may include a cellular telephone 11. The cellular cell phone 11 may include a display screen 12 and a key pad 13 communicatively coupled thereto. Notably, the display screen 12 is physically spaced from the key pad 13. A protective water-proof casing 20 is connected to the cellular telephone 11 whereby the display screen 12 remains operably responsive to the key pad 13 after the cellular telephone 11 is submerged in water. Such a structural combination of elements provides the unexpected and unpredictable advantage of being able to easily disconnect the keypd 13 from the display screen 12 during routine maintenance or when either element needs to be replaced. Also, disconnection permits the interior portions of the cell phone 11 to more quickly dry should the user desire to "air out" the internal components of the present invention.

The water-proof casing may include a first sheath 21 and a second sheath 23 preferably having corresponding outer edges 22, 24. The second sheath 23 may be mated to the first sheath 21 such that the outer edge 24 of the second sheath 23 entirely and coextensively adjoins the outer edge 22 of the first sheath 21. A gasket 25 may be intermediately intercalated between the first and second sheaths 21, 23 and thereby prevent water from penetrating through the outer edges 22, 24 of the first and second sheaths 21, 23 respectively. A plurality of ports 26 may be formed in the water-proof casing, and a plurality of port covers 27 may be removably interfitted within the ports 26. Such an arrangement provides the unexpected and unpredicted advantage of combining a cellular telephone 11 with a water-proof casing 20 whereby the device 10 may be submerged in water without fear water damaging the cellular phone 11.

Figure 7:
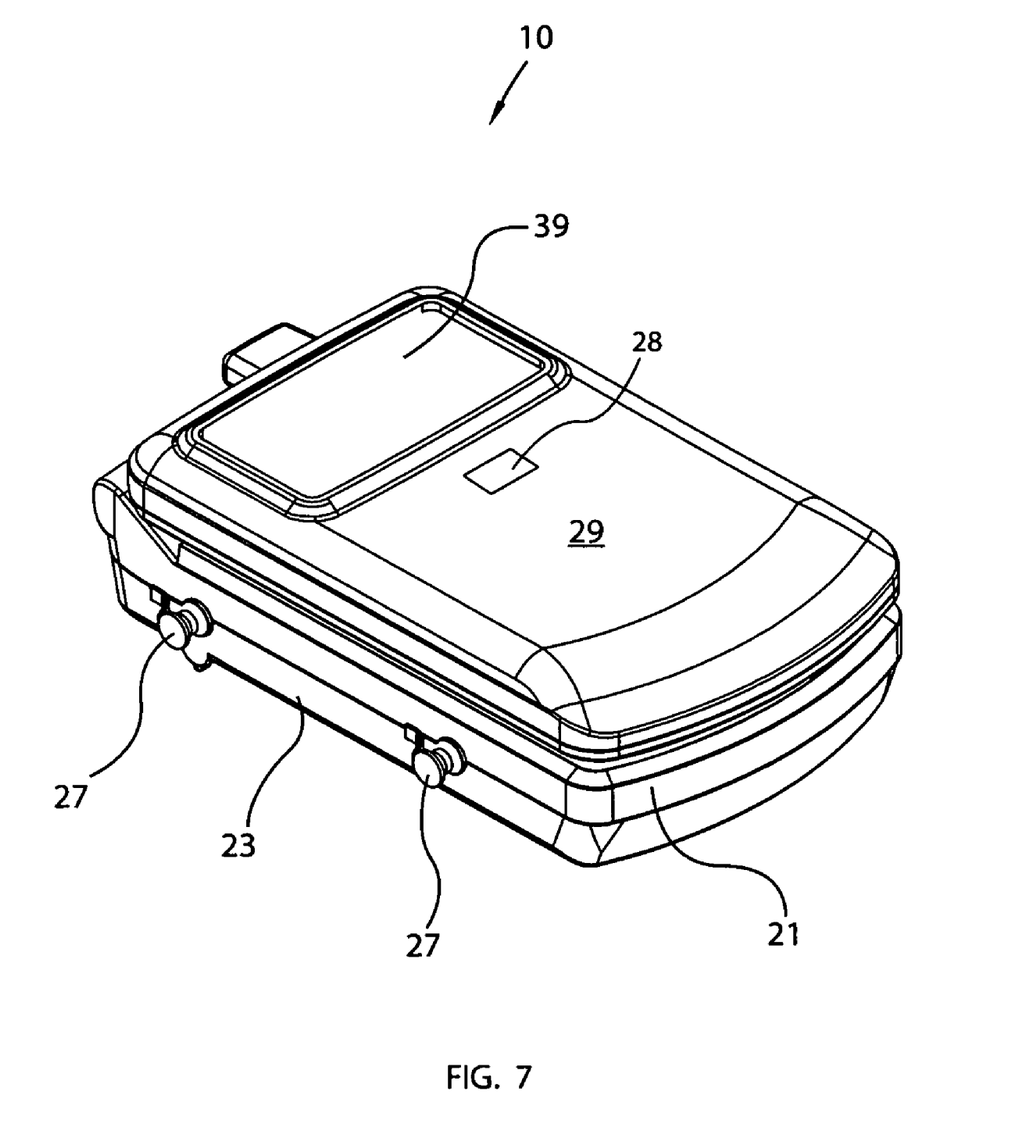
FIG. 7 is a perspective view of the combined cellular phone and water-proof casing in a close position.
Figure 8:
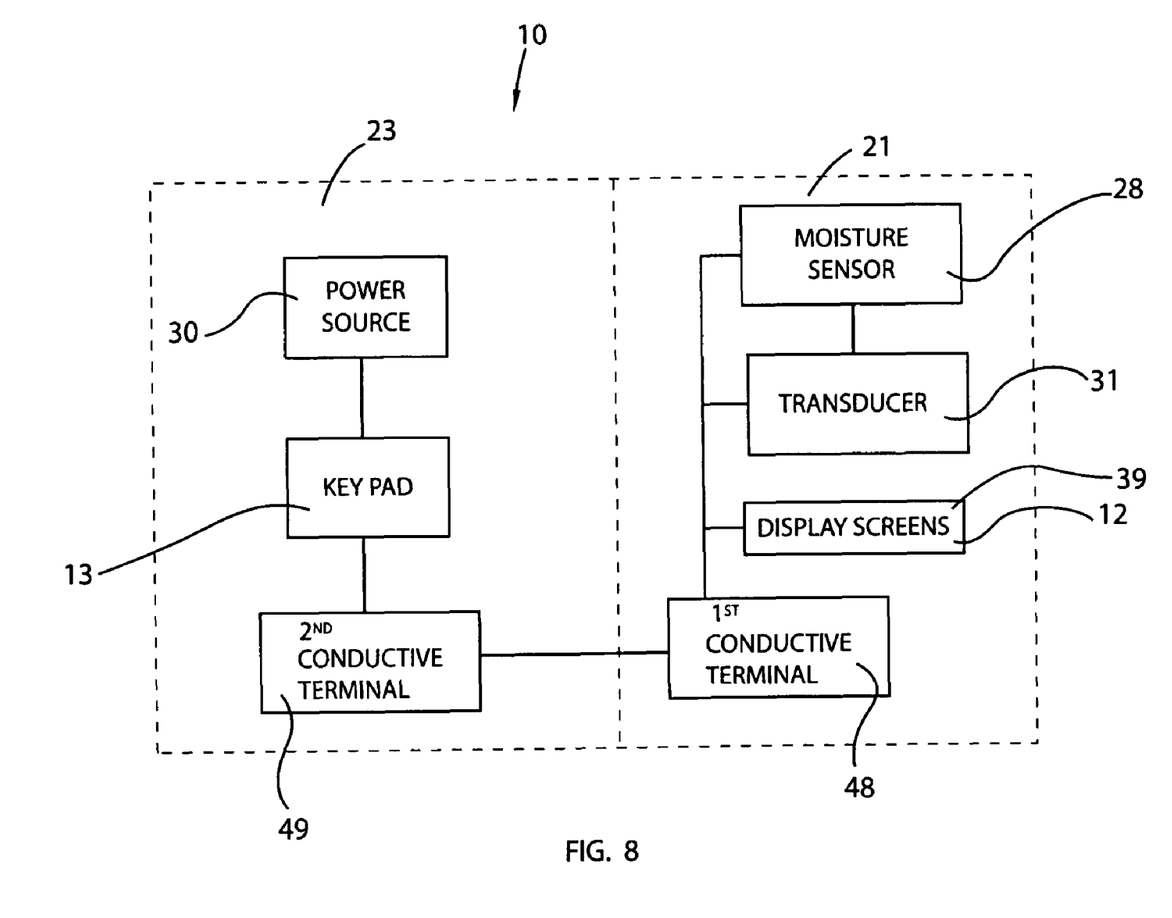
FIG. 8 is a high-level schematic block diagram illustrating the interrelationship between the major electronic components of the moisture detecting mechanism and electrical communication between the keypad and display screens.

As perhaps best shown in FIGS. 7 and 8, the combined cellular phone and water-proof casing 10 may further include a moisture sensor 28 connected to an outer surface 29 of the first sheath 21. A power source 30 may be seated within the second sheath 23 and electrically coupled to the moisture sensor 28. A transducer 31 may be communicatively coupled to the moisture sensor 28 and located at the outer surface 29 of the first sheath 21. In this manner, upon detecting water, the moisture sensor 28 may generate and transmit a control signal to the transducer 31. Upon receiving the control signal, the transducer 31 generates and emits an alert signal for a predetermined time interval. Such an arrangement may provide the unexpected and unpredicted advantage of enabling a user to locate his/her cellular phone 11 if it is accidentally dropped in water which may be murky or dark.

Figure 1:
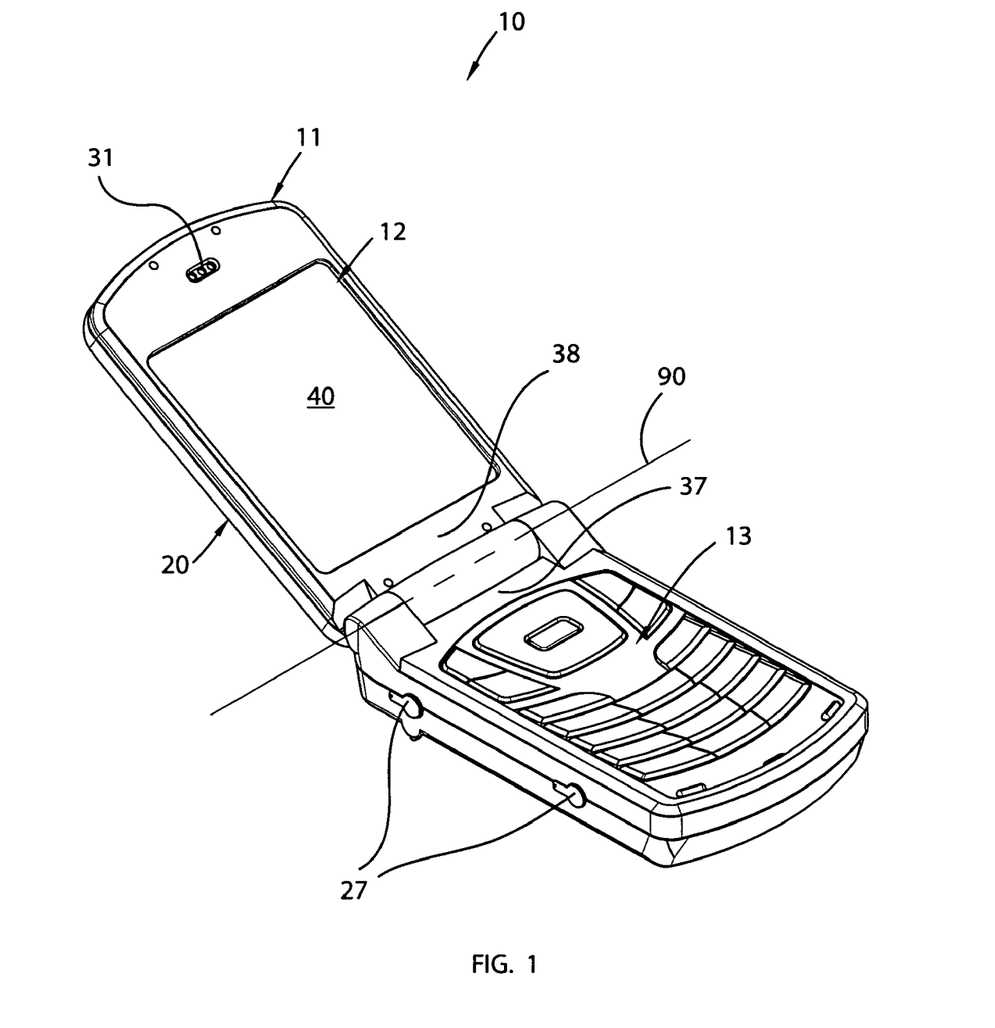
FIG. 1 is a perspective view showing a combined cellular phone and water-proof casing in an open position, in accordance with the present invention.
Figure 2:
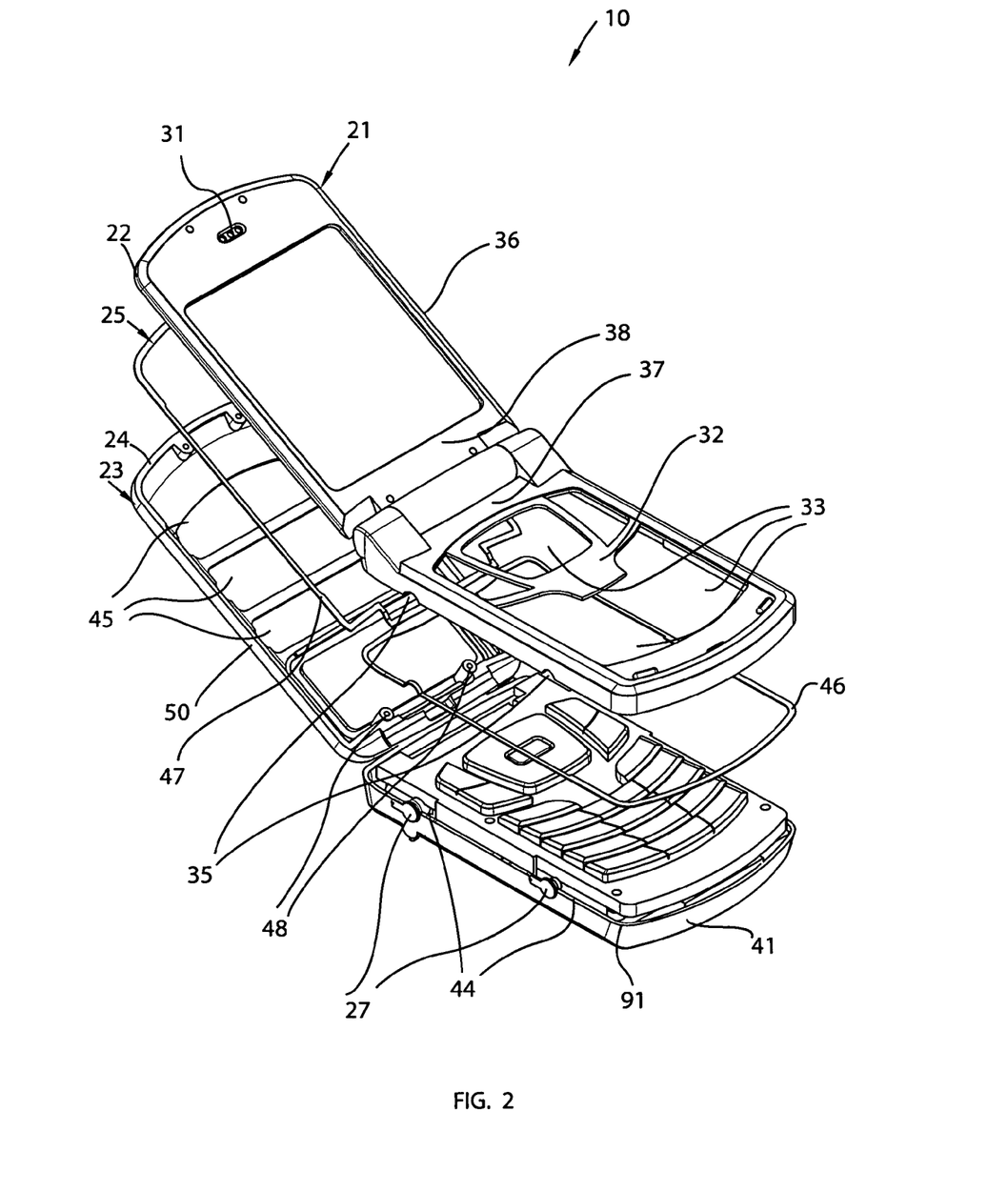
FIG. 2 is an exploded view of the combined cellular phone and water-proof casing shown in FIG. 1.
Figure 3:
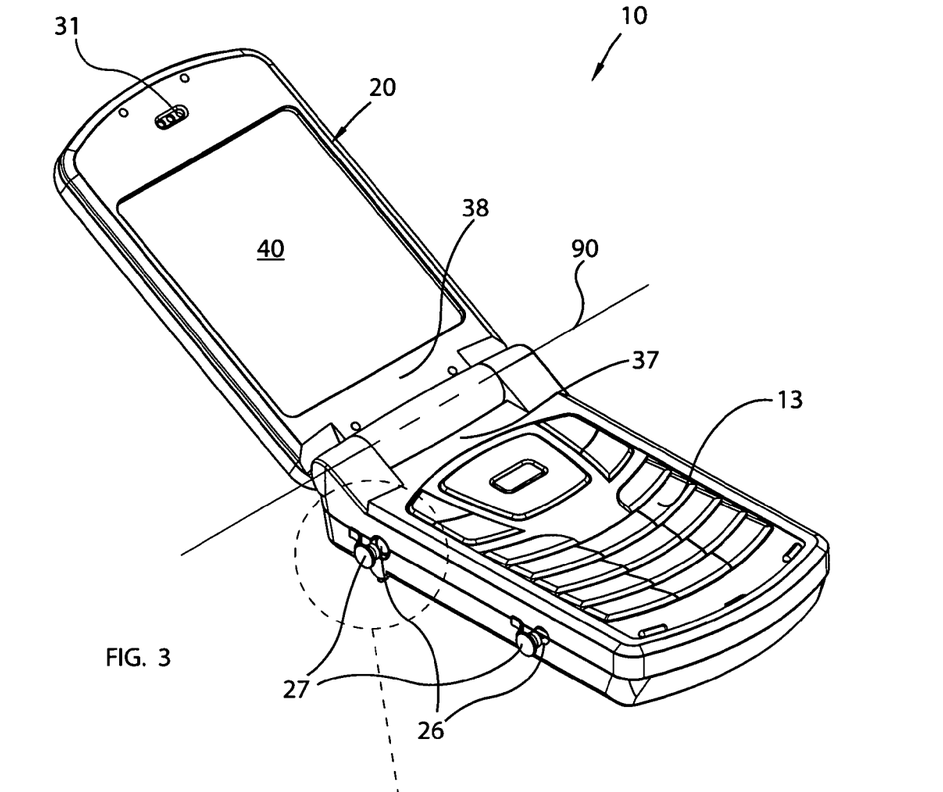
FIG. 3 is a perspective view of the combined cellular phone and water-proof casing showing the port covers.
Figure 4:
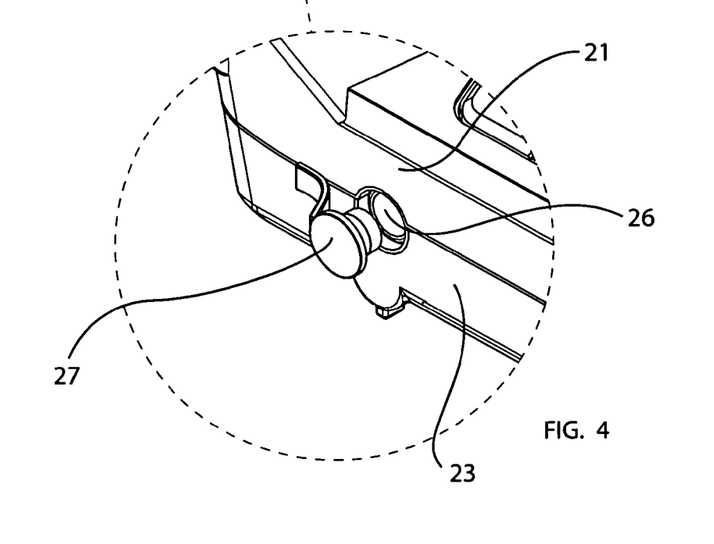
FIG. 4 is an enlarged view of a port cover shown in FIG. 3.
Figure 5:
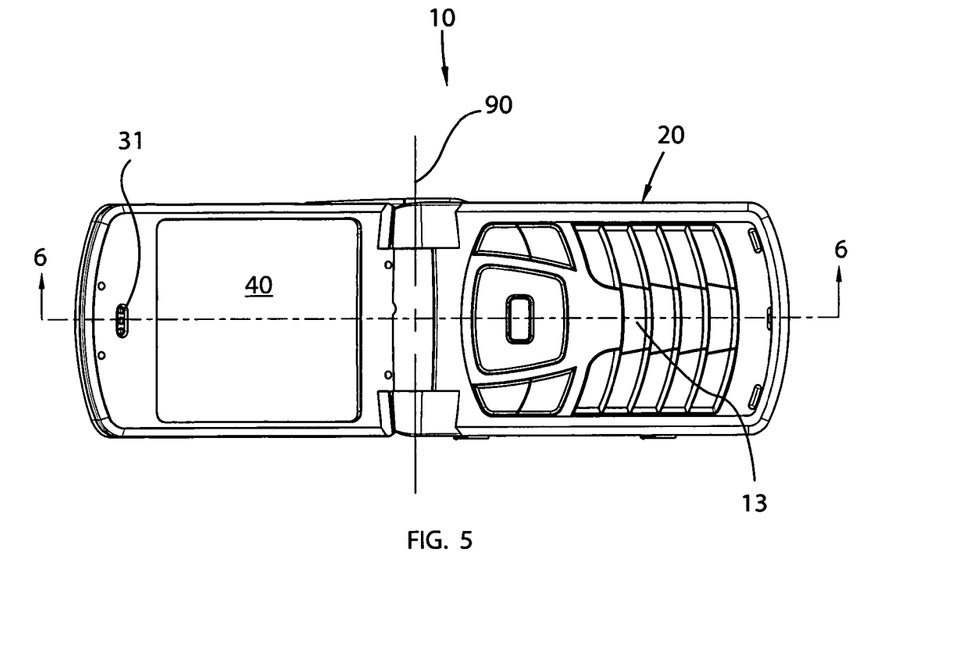
FIG. 5 is a top plan view of the combined cellular phone and water-proof casing shown in FIG. 1.

Referring to FIGS. 1, 2, and 3, the first sheath 21 may include a first segment 32 preferably having a recessed portion 33 formed at a bottom surface thereof and a plurality of cut-out segments 35 aligned about the ports 26 and the keypad 13 of the cellular phone 11, respectively. A second segment 36 may house the display screen 12 of the cellular phone 11. A top edge 37 of the first segment 32 may be pivotally coupled to bottom edge 38 of the display screen 12 such that the first sheath 21 is pivotal along a pivot axis 90 traversing overlapping regions of the first and second segments 32, 36 respectively. Such an arrangement provides the unexpected and unpredicted advantage of integrating the cellular phone 11 with the water-proof casing 20 in a manner whereby the display screen 12, keypads 13 and communication ports 26 of the cellular phone may be effectively utilized while enclosed within the water-proof casing 20.

As perhaps best shown in FIGS. 1 and 7, the display screen 12 may include front and rear viewing panels 39, 40 respectively positioned at front and rear sides of the second segment 36 of the first sheath 21.

Figure 6:
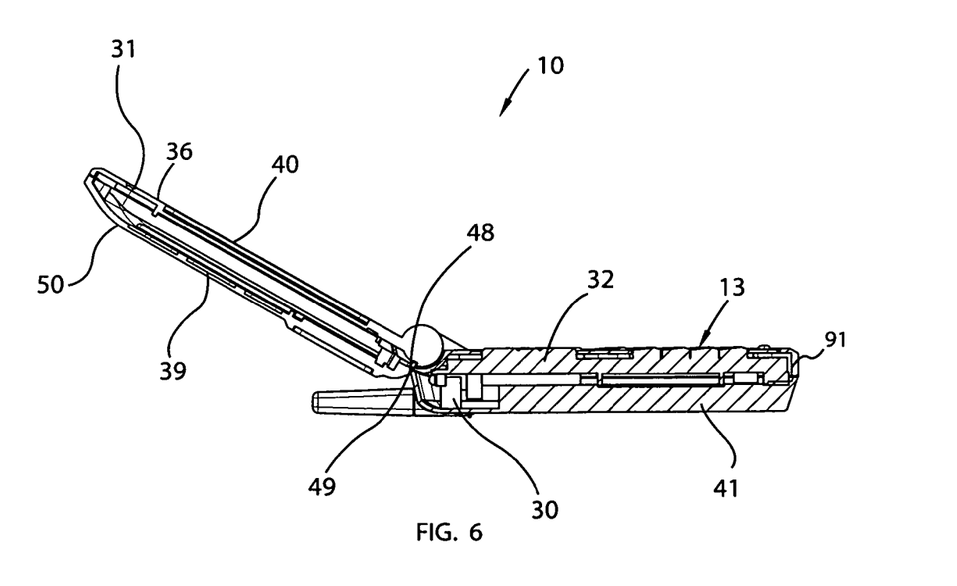
FIG. 6 is a cross-sectional view taken along line 6-6 in FIG. 5.

Referring now to FIGS. 2 and 6, the second sheath 23 may include a first segment 41 preferably having a recessed portion 91 formed at a top surface such that the keypad 13 of the cellular phone 11 becomes nested within the recessed portion 91 of its first segment 41. The first segment 41 may further include a plurality of cut-out portions 44 aligned about the ports 26. A second segment 50 may include a plurality of openings 45 formed therein and thereby provide open lines of sight to the second viewing panel 40.

Further, the first segment 41 may be pivotally mated to the second segment 50 of the second sheath 23 and thereby pivot along the pivot axis 90. Such an arrangement provides the unexpected and unpredicted advantage of integrating the cellular phone 11 with the water-proof casing 20 in a manner whereby the electronic components and communication ports 26 of the cellular phone may be effectively enclosed within the water-proof casing 20 while at the same time allowing the cellular phone 11 to be hingedly opened and closed easily about the pivot axis 90.

Again referring to FIGS. 2 and 6, the gasket 25 may include a first continuous member 46 intercalated along corresponding outer perimeters of the first segments 32, 41 of each of the first and second sheaths 21, 23, respectively. A second continuous member 47 may be intercalated along corresponding outer perimeters of the second segments 36, 50 of each of the first and second sheaths 21, 23 respectively. The first and second continuous members 46, 47 may further be directly connected along the pivot axis 90. Such an arrangement provides the unexpected and unpredicted advantage of effectively sealing the outer edges of the first and second sheaths 21, 23 respectively to prevent entry of water when the sheaths 21, 23 are pressed mated together. This also solves the problem of moisture creeping into terminals 48, 49 (described hereinbelow).

Referring to FIGS. 2, 6 and 8, the combined cellular phone and water-proof casing 10 may include a first plurality of conductive terminals 48 communicatively coupled to the keypad 13 and located at a bottom edge of the second section 50 of the second sheath 23. A second plurality of conductive terminals 49 may be communicatively coupled to the display screen 12 and located at the bottom edge 38 of the second section 36 of the first sheath 21. In this way, the first and second pluralities of conductive terminals 48, 49 may be electrically mated together and thereby communicatively couple the keypad 13 to the display screen 12.

The invention may further include a method of utilizing a combined cellular phone and water-proof casing 10 for maintaining the cellular phone 11 at an operable mode after being submerged in water. Such a method may include the chronological steps of: providing a cellular telephone 11 including a display screen 12 and a key pad 13 communicatively coupled thereto; providing a protective water-proof casing 20; and connecting the water-proof casing 20 to the cellular telephone 11 in such a manner that the display screen 12 remains operably responsive to the key pad 13 after the cellular telephone 11 is submerged in water.

The method may further include the sub-steps of: providing a first sheath 21 preferably having an outer edge 22; providing a second sheath 23 preferably having an outer edge 24; providing and mating the second sheath 23 to the first sheath 21 such that the outer edge 24 of the second sheath 23 entirely and coextensively adjoins the outer edge 22 of the first sheath 21; and providing and preventing water from penetrating through the outer edges 22, 24 of the first and second sheaths 21, 23, respectively, by providing and intermediately intercalating a gasket 25 between the first and second sheaths 21, 23.

The method may further include the chronological steps of: providing a plurality of ports 26 formed in the water-proof casing 20; providing and removably interfitting a plurality of port covers 27 within the ports 26; and maintaining the display screen 12 physically spaced from the key pad 13.

The combination of such claimed elements provides an unpredictable and unexpected benefit of water-proofing cellular phones 11, which solves the problem of users having to avoid using the cellular phones 11 in close proximity with water. In addition, the alerting signal of the moisture sensor 28 further assists a user to locate his/her cellular phone 11 should the combined cellular phone and water-proof casing 10 accidentally drop into dark or murky water.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined cellular phone and water-proof casing for maintaining said cellular phone at an operable mode after being submerged in water, said combined cellular phone and water-proof casing comprising:
   a cellular telephone including a display screen and a key pad communicatively coupled thereto; and
   a protective water-proof casing connected to said cellular telephone in such a manner that said display screen remains operably responsive to said keypad after said cellular telephone is submerged in water, said water-proof casing including:
      a first sheath having an outer edge;
      a second sheath having an outer edge, said second sheath being mated to said first sheath such that said outer edge of said second sheath entirely and coextensively adjoins said outer edge of said first sheath,
      a gasket intermediately intercalated between said first and second sheaths and thereby preventing water from penetrating through said outer edges of said first and second sheaths respectively,
      a plurality of ports formed in said water-proof casing, and a plurality of port covers removably interfitted within said ports;
      a moisture sensory connected to an outer surface of said first sheath;
      a power source seated within said second sheath and electrically coupled to said moisture sensor; and
      a transducer communicatively coupled to said moisture sensor and located at said outer surface of said first sheath;
      wherein, upon detecting water, said moisture sensor generates and transmits a control signal to said transducer;
      wherein, upon receiving said control signal, said transducer generates and emits an alert signal for a predetermined time interval;
      wherein said first sheath comprises a first segment and a second segment, wherein a top edge of said first segment of said first sheath is pivotally coupled to a bottom edge of said second segment such that said first sheath is pivotal along a pivot axis traversing overlapping regions of said first and second segments respectively,
      wherein said second sheath comprising a first segment and a second segment, wherein said first segment of said second sheath is pivotally mated to said second segment of said second sheath and thereby pivotal along said pivot axis,
      wherein said gasket comprising:
         a first continuous member intercalated along corresponding outer perimeters of said first segments of each of said first and second sheaths respectively; and
         a second continuous member intercalated along corresponding outer perimeters of said second segments of each of said first and second sheaths respectively;
         wherein said first and second continuous members are directly connected along said pivot axis.

2. The combined cellular phone and water-proof casing of claim 1, wherein said first segment of said first sheath comprises:
   a recessed portion formed at a bottom surface thereof, said first segment further having a plurality of cut-out segments aligned about said ports and said keypad of said cellular phone respectively; and
   wherein said second segment of said first sheath housing said display screen of said cellular phone;
   wherein said top edge of said first segment of said first sheath is pivotally coupled to a bottom edge of said display screen of said cellular telephone such that said first sheath is pivotal along a pivot axis traversing overlapping regions of said first and second segments respectively.

3. The combined cellular phone and water-proof casing of claim 2, wherein said display screen comprises: front and rear viewing panels respectively positioned at front and rear sides of said second segment of said first sheath.

4. The combined cellular phone and water-proof casing of claim 3, wherein said first segment of said second sheath comprises:
   a recessed portion formed at a top surface thereof, said keypad of said cellular phone being nested within said recessed portion of said first segment of said second sheath, said first segment further having a plurality of cut-out portions aligned about said ports; and
   wherein said second segment of said second sheath having a plurality of openings formed therein and thereby providing open lines of sight to said second display screen;
   wherein said first segment of said second sheath is pivotally mated to said second segment of said second sheath and thereby pivotal along said pivot axis.

5. The combined cellular phone and water-proof casing of claim 4, further comprising:
   a first plurality of conductive terminals communicatively coupled to said keypad and located at a bottom edge of said second section of said second sheath; and
   a second plurality of conductive terminals communicatively coupled to said display screen and located at said bottom edge of said second section of said first sheath;
   wherein said first and second pluralities of conductive terminals are electrically mated together and thereby communicatively couple said keypad to said display screen.

6. A combined cellular phone and water-proof casing for maintaining said cellular phone at an operable mode after being submerged in water, said combined cellular phone and water-proof casing comprising:
   a cellular telephone including a display screen and a keypad communicatively coupled thereto, said display screen being physically spaced from said keypad; and
   a protective water-proof casing connected to said cellular telephone in such a manner that said display screen remains operably responsive to said keypad after said cellular telephone is submerged in water, said water-proof casing including:

a first sheath having an outer edge;
a second sheath having an outer edge, said second sheath being mated to said first sheath such that said outer edge of said second sheath entirely and coextensively adjoins said outer edge of said first sheath,
a gasket intermediately intercalated between said first and second sheaths and thereby preventing water from penetrating through said outer edges said first and second sheaths respectively,
a plurality of ports formed in said water-proof casing, and
a plurality of port covers removably interfitted within said ports, a moisture sensory connected to an outer surface of said first sheath;
a power source seated within said second sheath and electrically coupled to said moisture sensor; and
a transducer communicatively coupled to said moisture sensor and located at said outer surface of said first sheath;
wherein, upon detecting water, said moisture sensor generates and transmits a control signal to said transducer;
wherein, upon receiving said control signal, said transducer generates and emits an alert signal for a predetermined time interval;
wherein said first sheath comprises a first segment and a second segment, wherein a top edge of said first segment of said first sheath is pivotally coupled to a bottom edge of said second segment such that said first sheath is pivotal along a pivot axis traversing overlapping regions of said first and second segments respectively,
wherein said second sheath comprising a first segment and a second segment, wherein said first segment of said second sheath is pivotally mated to said second segment of said second sheath and thereby pivot along said pivot axis,
wherein said gasket comprising:
    a first continuous member intercalated along corresponding outer perimeters of said first segments of each of said first and second sheaths respectively; and
    a second continuous member intercalated along corresponding outer perimeters of said second segments of each of said first and second sheaths respectively;
    wherein said first and second continuous members are directly connected along said pivot axis.

7. The combined cellular phone and water-proof casing of claim 6, wherein said first segment of said first sheath comprises:
    a recessed portion formed at a bottom surface thereof, said first segment further having a plurality of cut-out segments aligned about said ports and said keypad of said cellular phone respectively; and
    wherein said second segment of said first sheath housing said display screen of said cellular phone;
    wherein said top edge of said first segment of said first sheath is pivotally coupled to a bottom edge of said display screen of said cellular telephone such that said first sheath is pivotal along a pivot axis traversing overlapping regions of said first and second segments respectively.

8. The combined cellular phone and water-proof casing of claim 7, wherein said display screen comprises: front and rear viewing panels respectively positioned at front and rear sides of said second segment of said first sheath.

9. The combined cellular phone and water-proof casing of claim 8, wherein said first segment of said second sheath comprises:
    a recessed portion formed at a top surface thereof, said keypad of said cellular phone being nested within said recessed portion of said first segment of said second sheath, said first segment further having a plurality of cut-out portions aligned about said ports; and
    wherein said second segment of said second sheath having a plurality of openings formed therein and thereby providing open lines of sight to said second display screen;
    wherein said first segment of said second sheath is pivotally mated to said second segment of said second sheath and thereby pivotal along said pivot axis.

10. The combined cellular phone and water-proof casing of claim 9, further comprising:
    a first plurality of conductive terminals communicatively coupled to said keypad and located at a bottom edge of said second section of said second sheath; and
    a second plurality of conductive terminals communicatively coupled to said display screen and located at said bottom edge of said second section of said first sheath;
    wherein said first and second pluralities of conductive terminals are electrically mated together and thereby communicatively couple said keypad to said display screen.

* * * * *